US008151700B2

(12) United States Patent  
Nardi et al.

(10) Patent No.: US 8,151,700 B2
(45) Date of Patent: Apr. 10, 2012

(54) APPARATUS FOR MANUFACTURE OF FROZEN ELONGATED PASTA

(75) Inventors: Roberto Nardi, Rome (IT); Sandro Panaioli, Cisterna di Latina (IT); Valerio Simeone, Cisterna di Latina (IT)

(73) Assignee: Conopco, Inc., Englewood Cliffs, NJ (US)

( * ) Notice: Subject to any disclaimer, the term of this patent is extended or adjusted under 35 U.S.C. 154(b) by 1015 days.

(21) Appl. No.: 10/879,931

(22) Filed: Jun. 29, 2004

(65) Prior Publication Data

US 2004/0247764 A1 Dec. 9, 2004

Related U.S. Application Data

(62) Division of application No. 09/958,227, filed as application No. PCT/EP00/02480 on Mar. 20, 2000, now Pat. No. 7,179,498.

(30) Foreign Application Priority Data

Apr. 7, 1999 (EP) .................................. 99302712

(51) Int. Cl.
*A21C 3/00* (2006.01)
*A21C 9/08* (2006.01)
*A23L 3/36* (2006.01)

(52) U.S. Cl. ................ 99/483; 99/355; 99/404; 99/407; 426/509; 426/517; 426/524

(58) Field of Classification Search ............ 99/325–333, 99/352–355, 483, 403–418, 485–487; 426/451, 426/506, 508, 515, 557
See application file for complete search history.

(56) References Cited

U.S. PATENT DOCUMENTS 1,855,540 A * 4/1932 Baker et al. .................... 99/352

| 2,013,906 | A | * | 9/1935 | Boiardi ........................... 99/404 |
| 4,182,230 | A | * | 1/1980 | Sakurazawa .................... 99/349 |
| 4,321,858 | A | * | 3/1982 | Williams ........................ 99/353 |
| 4,418,085 | A | * | 11/1983 | Becquelet .................... 426/297 |
| 4,579,746 | A | | 4/1986 | Hirose |
| 4,685,386 | A | * | 8/1987 | Bezon ............................ 99/404 |
| 4,693,900 | A | | 9/1987 | Molinari |
| 5,073,393 | A | * | 12/1991 | Defrancisci .................. 426/508 |

(Continued)

FOREIGN PATENT DOCUMENTS

CH 684339 A5 * 8/1994

(Continued)

OTHER PUBLICATIONS

International Search Report dated Aug. 14, 2000.

(Continued)

*Primary Examiner* — Joseph M Pelham
(74) *Attorney, Agent, or Firm* — Alan A. Bornstein

(57) ABSTRACT

The present invention provides a process for the manufacture of frozen instant cooking pasta from elongated dried pasta products that substantially retains the pre-processing length of the dried pasta comprising the steps of;
(i) dividing an elongated dried pasta products into one or more portions, each portion having a desired mass;
(ii) loading each portion of pasta into one of a plurality of separate dosing devices;
(iii) re-hydrating each portion of pasta within a dosing device;
(iv) quenching the re-hydrated pasta resulting from step (iii);
(v) freezing.
Further embodiments are directed to the apparatus that is necessary for carrying out this process and the frozen product achieved.

4 Claims, 3 Drawing Sheets

U.S. PATENT DOCUMENTS

Figure 1:
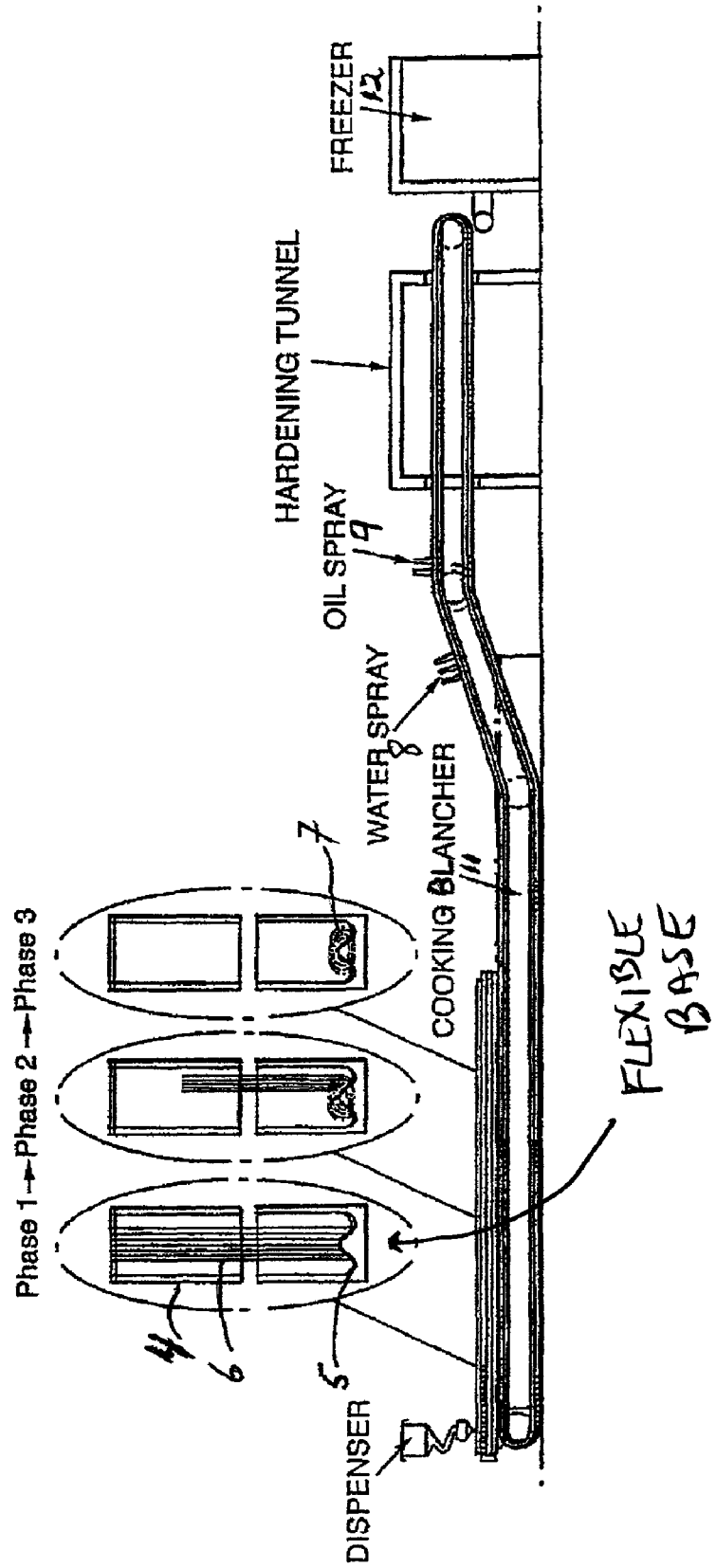

| | | | |
|---|---|---|---|
| 5,151,289 A | | 9/1992 | Ozawa et al. |
| 6,120,828 A * | | 9/2000 | Miyagawa et al. ............ 426/524 |
| 6,235,330 B1 * | | 5/2001 | Scherpf et al. ................ 426/302 |
| 2002/0025365 A1 * | | 2/2002 | DeFrancisci et al. ......... 426/399 |

FOREIGN PATENT DOCUMENTS

| | | |
|---|---|---|
| EP | 0 533 975 | 7/1994 |
| EP | 0 531 743 | 1/1995 |
| EP | 0 704 168 | 4/1996 |
| GB | 2 247 603 | 3/1992 |
| IT | 1 247 939 | 1/1995 |
| JP | 07187278 A * | 7/1995 |

OTHER PUBLICATIONS

Database WPI—Derwent abstract of JP 10-257865.
Patent Abstracts of Japan, vol. 007, No. 053 of JP 57 202260.
Patent Abstract of Japan of JP 3175942.
Database WPI, Derwent Abstract of JP 09-313121.
Abstract of JP 60016563 A.
Abstract of JP 8242795 A.
Abstract of FR 2707138 a.
Abstract of KR 9402525.
Abstract of JP 7203887 A.
Abstract of JP 5041968 A.
Abstract of JP 86052658 A.
Abstract of JP 60087748 A.
Abstract of Publication JP 06-121647 A.
Abstract of Publication JP 03-201957 A.
Abstract of Publication JP 01-095758 A.
Abstract of Publication JP 61-058550 A.
Abstract of Publication JP 60-105467 A.

* cited by examiner

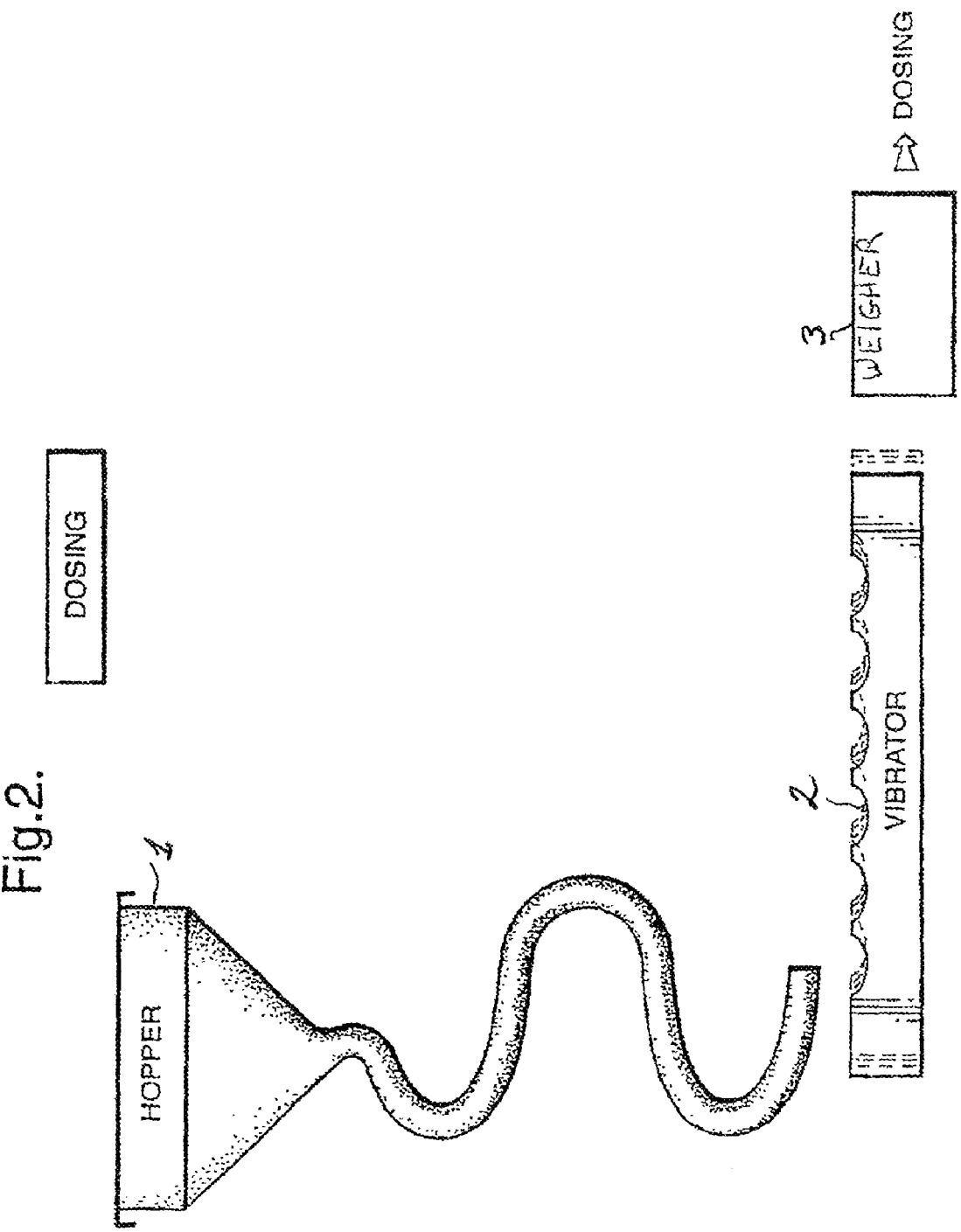

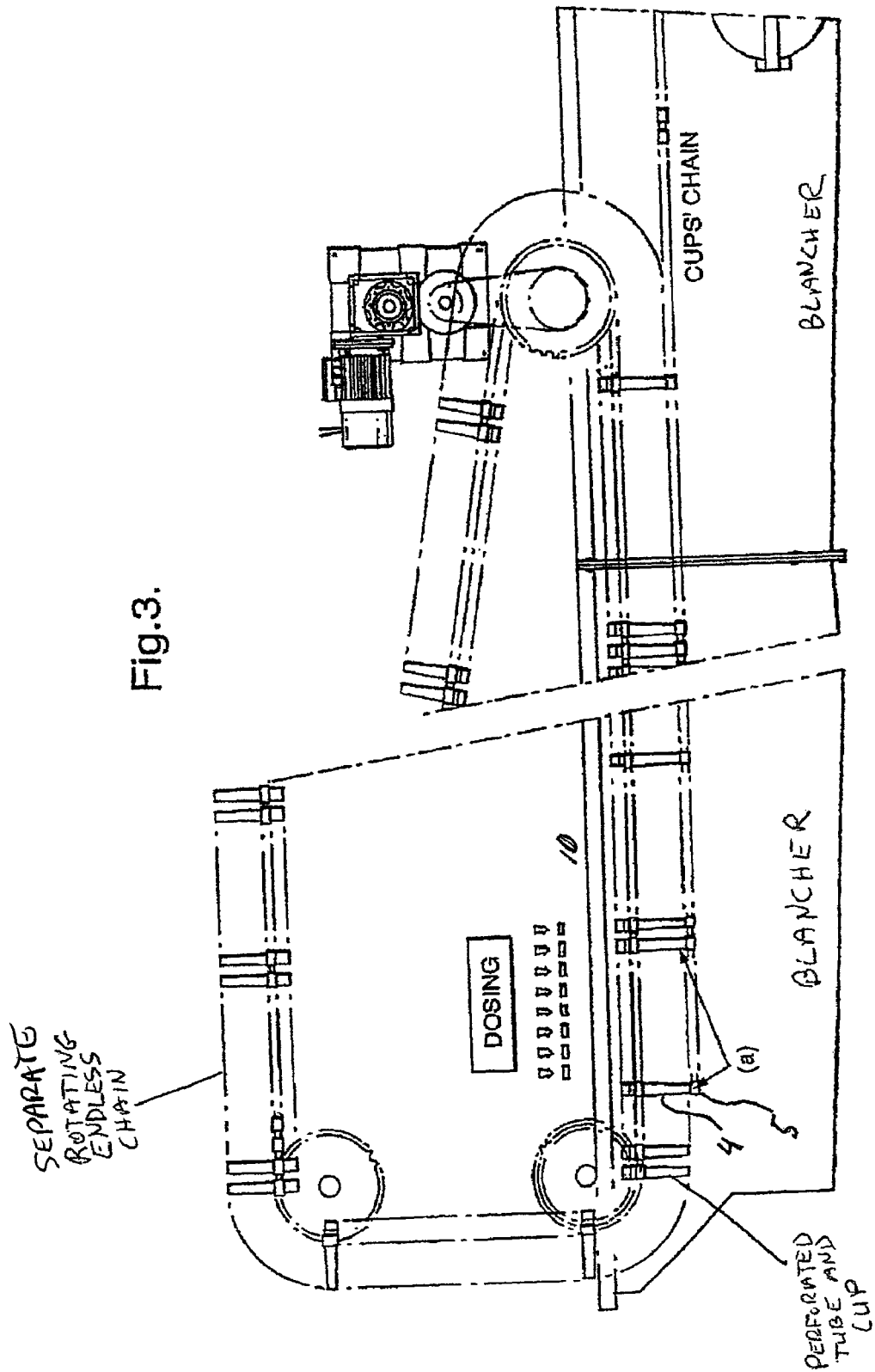

APPARATUS FOR MANUFACTURE OF FROZEN ELONGATED PASTA

This is a divisional application of prior application Ser. No. 09/958,227 filed on Jan. 3, 2002 now U.S. Pat. No. 7,179,498 entitled Frozen Food Product which is a Section 371 filing of PCT/EP 00/02480 filed Mar. 20, 2000.

The invention relates to the field of re-heatable frozen pasta products and particularly to frozen nests of elongated pasta products, such as spaghetti, linguine tagliatelle, bucatini.

BACKGROUND TO THE INVENTION

The technology for the formation of dried elongated pasta has long been available wherein fresh pasta strands are shaped commonly into a nest shape and exposed to high temperature drying conditions. The resultant dried nests are unsuitable for inclusion in re-heatable frozen meals as the shape is inevitably lost when the pasta is re-hydrated during pre-cooking. Consequently subsequent portioning steps prior to freezing necessitate the undesirable cutting of the pasta lengths.

The prior art further describes frozen pasta formed by a process wherein a fresh pasta sheet is cut into strips and portioned by directly filling a mould. These bundles of pasta are subsequently cooked within the mould and may then be frozen.

The portioning of fresh pasta prior to a cooking step overcomes the difficulties associated with later division, effectively removing the necessity for random cutting of the pasta. The flexible nature of fresh pasta lends itself well to portioning prior to cooking however it is not possible to achieve an 'al dente' texture from the fresh pasta and so the essence of a traditionally cooked Italian meal cannot be achieved by this route.

In order to maintain an 'al dente' texture in the re-heated product it is desirable for a pasta that has undergone a high temperature drying process to be used as the starting material. Methods known in the prior art for the production of frozen pasta in which re-hydrated dried pasta has been used are predominantly limited to those wherein short pasta products such as penne, fuselli etc. undergo cooking and freezing.

The Applicants have therefore identified a desire to introduce elongated re-hydrated pasta products which have undergone high temperature drying into instant cooking frozen pasta meals, wherein the length of the pasta is maintained in the prepared meal.

The inflexible and fragile nature of elongated dried pasta products presents considerable technical difficulties. Such products are particularly difficult to portion on an industrial scale when re-hydrated and clearly cannot be molded into nests when in their dried form. Previous attempts to prepare frozen elongated pasta products have involved the horizontal cooking of pasta lengths in a large vessel then straining and portioning, however known techniques for portioning of the entangled lengths of pasta have not allowed the cutting of the pasta to be avoided. Consequently the product quality is considerably compromised by the presence of short pasta lengths.

The Applicants have identified an further consumer need for high quality frozen pasta meals that not only comprise substantially intact lengths of elongated pasta products but are instantly re-heatable in the home.

Reducing the mass of pasta in each portion to give a shorter re-heating time while providing a desirable nest shape has been found to present further technical problems. Using only a small amount of pasta it is particularly difficult to form and retain an appealing nest shape.

Achieving a nest shape in the frozen pasta besides being attractive is also desirable as it make the pasta lengths less vulnerable to breakage during any subsequent processing.

The Applicants by way of the present invention have devised a system which overcomes the problems outlined above, where frozen instant cooking pasta can be produced from elongated dried pasta products.

The present invention is therefore directed towards a process for the manufacture of frozen instant cooking pasta from elongated dried pasta products that substantially retains the pre-processing length of the dried pasta. Further embodiments are directed to the apparatus that is necessary for the formation thereof and the product achieved.

SUMMARY OF THE INVENTION

The Applicants have developed a process to produce instantly re-heatable frozen bundles of elongated pasta products which retain an 'al dente' texture by virtue of them being formed from dried pasta and also substantially retain the pre-processing length of the pasta by the avoidance of cutting as a means of dividing once re-hydrated.

The invention in the first aspect therefore provides a process for the manufacture of instant cooking frozen pasta comprising the steps of;
  (i) dividing an elongated dried pasta product into one or more portions, each portion having a desired mass;
  (ii) loading each portion of pasta into one of a plurality of separate dosing devices;
  (iii) re-hydrating each portion of pasta within a dosing device;
  (iv) quenching the re-hydrated pasta resulting from step (iii);
  (v) freezing.

These and other aspects of the invention will be described in further detail in the description that will follow hereinafter.

DETAILED DESCRIPTION

The exposure of pasta dough to high temperatures during drying procedures has considerable effects on the compositional structure of the dough which serve to improve the perceived texture when cooked.

Gluten denaturation occurs from 60 to 80° C. and results in the formation of a protein lattice structure which entraps starch particles and helps to prevent starch loss to the cooking water during re-hydration. Although there are a number of techniques which would be suitable for the drying of pasta dough for the purpose of the invention, it is preferable that the pasta dough undergoes a High Temperature Short Time (HTST) drying procedure.

A high quality flour with a high gluten content, for example Durham wheat derived semolina flour, is preferably used in the dough since this will give rise to a dense lattice structure when dried. Consequently yielding a higher quality product with better textural properties when re-hydrated.

It must be appreciated however that dried pasta dough made from softer wheat may also be used in the present invention, wherein the degree of re-hydration may be reduced to texturally compensate for poorer quality i.e. lower gluten containing ingredients.

For the purpose of the present invention any type of dried pasta which takes an elongated form may be used, these may have been extruded or cut from a dough sheet. Names of particular pasta products commonly differ on a regional basis and therefore it is believed that the skilled person would appreciate the range of dried pasta products that may suited to the invention. Preferably the instant cooking frozen pasta of the invention comprises one or more pasta products selected from the group comprising spaghetti, linguine, bucatini and tagliatelle. Most preferred the pasta comprises spaghetti.

For the purpose of clarity and with no intention of limiting the scope of the invention further aspects shall be described with reference to the attached drawings, in which;

FIG. 1; shows a diagrammatic overview of a suitable production line for the manufacture of pasta according to the invention.

FIG. 2; represents the portioning step wherein strands of dried pasta are loaded into the labeled hopper (1) from where they are dispensed onto a portioning device (2) and subsequently weighed (3).

FIG. 3; represents the apparatus involved in the re-hydration of the pasta during a blanching step.

In the embodiment described in the figures dried pasta products are fed from a hopper (1) to a portioning device (2), FIG. 2, which by a vibrating action arranges the pasta lengths into portions parallel to one another in grooves on the surface of said device, which can subsequently be weighed.

Portions of dried pasta of any desirable size may be used in the process of the invention, depending on the size of the pasta nests that are sought.

It is desirable for the modern consumer that frozen food products are developed that can be reheated for consumption in an instant. The applicants have found that in order to maintain a short re-heating time for the frozen product of the invention it is necessary for the weight of the individual pasta nests to remain small, preferably produced from less than 50 grams dried pasta. More preferred the dried pasta weight is less than 30 grams. A most preferred embodiment is based on the finding that a frozen nest made from less than 15 grams of dried pasta can be reheated in less than 5 minutes cooking time, typically such a frozen nest will have a hydrated mass of less than around 30 grams.

The problem of shaping such small quantities of pasta to a nest is solved by having a dosing device (4) with appropriate dimensions. The desired amount of pasta (6) for each nest is loaded into each dosing device (4).

The dosing devices (4) provide an important component of the apparatus of the invention and allow the portions of dried pasta to be individually re-hydrated and shaped to a nest (7), not only avoiding any post-re-hydration cutting step but also generating a form that once frozen will preserve the length of the pasta by reducing the likelihood of damage during subsequent processing.

The dosing device (4) may take the form of a single component comprising a perforated tube with an opening at one end which is extended to a cup-shaped base (5) at the other. The perforated material allows for the entry and exit of the boiling water when submerged in a cooking blancher.

In another embodiment the perforated tube (4) and cup components (5) of the dosing device may be reversibly attached to one another to facilitate both access to the pasta portion when hydrated or frozen and cleaning of the apparatus.

Alternatively the dosing device may comprise a separate perforated tube (4) and cup component (5), as illustrated at (a) in FIG. 3, wherein these two components are each attached to separate rotating endless chains, which operate in a coordinated cycle that allows the positioning of the components so that dried pasta can be loaded into the tube (4) from above, wherein it rests vertically supported by the cup component (5) beneath, phase 1 of FIG. 1

The shape of the cup component (5) of the dosing device (4) may show some considerable variation depending on the desired shape of the pasta nest (7). The cup may for example take a convex almost hemispherical shape or have a flat base.

More preferably the perforated cup component (5) at the base of the dosing device (4) has a concave cone-shape indentation as illustrated in FIG. 1. This serves to facilitate the shaping of the pasta into an appealing toroidal shape. In a most preferred embodiment the cup (5) has substantially cylindrical walls and a slightly convex perforated base which has the capacity to flex to an equally concave position. This flexing action is utilized to facilitate the emptying of the pasta nest (7) when formed.

The desired amount of pasta is positioned vertically in each dosing device which is then submerged in the boiling water of the cooking blancher to allow re-hydration. As re-hydration progresses the pasta (6) softens and falls to the bottom of the device to be supported by the cup component where it forms a nest (7) as illustrated by phases 1 to 3 of FIG. 1.

It is appreciated that the positioning of the dosing devices could be altered such that the portions of pasta (6) are re-hydrated by sub-merging the devices in the water of the cooking blancher in a substantially horizontal dimension and subsequently moving vertically to allow the pasta (6) to fall and be shaped by the cup component (5).

In a further alternative, portions of dried pasta (6) may be quenched and frozen after re-hydration in a dosing device in a substantially horizontal dimension without the subsequent formation of a nest shape (7).

The Applicants have found that re-hydrating the pasta to a ratio of between 170 and 195% provides good textural properties when reheated for consumption, preferably the pasta is re-hydrated to the range 180 to 190%. This takes between 5 and 10 minutes in the blancher with variation depending on the diameter of the pasta type being prepared.

The degree to which re-hydration is achieved can be somewhat altered according to the quality of the pasta that is used in the invention. Where a high quality, high gluten content flour is used, the dried dough can be more thoroughly re-hydrated without loss of texture on re-heating for consumption, thereby preserving the desired 'al dente' characteristic by virtue of maintaining a dense stable protein matrix.

Where the quality of dough is lower with less and/or poor quality gluten present, re-hydrating to a lesser extent can be used to partially compensate for the textural loss that would otherwise occur.

Once the re-hydration step is complete the dosing device (4), or simply the cup component (5) thereof, depending on the set-up, containing the pasta (6) can proceed to the next phase.

It is important that after re-hydration the pasta undergoes a quenching step (8) wherein cold water is used to rapidly cool the foodstuff and remove excess starch from the pasta surface. This reduces the sticking together of the pasta strands.

Once quenched the pasta may be frozen by any suitable means, however preferably a drum belt freezer is used. The pasta when subsequently removed retains the shape as predetermined by the shape of the cup (5) to the dosing device (4) and on re-heating provides long high quality 'al dente' texture pasta.

The length of the individual pasta strands will be determined by that of the pre-hydrated pasta (6) portioned into the dosing devices (4). The invention provides a method by which that pre-hydrated length is retained and shaped to a frozen nest in the absence of any intermediate cutting step. Thus the product when reheated resembles pasta as prepared in a traditionally cooked Italian meal.

Typically pasta nests (7) of invention will comprise elongated pasta in excess of 15 cm, preferably exceeding 20 cm, more preferred being in the range 25 cm to 30 cm. The maximum length of pasta that would be suitable for the purpose of the invention is dependent on the dimensions of the apparatus being used.

Preferably greater than 75% of the individual pasta strands (6) that make up each frozen pasta nest (7) of the invention are greater than 15 cm in length, more preferably greater than 80% are over 15 cm, more preferably greater than 90%, still more preferred greater than 95% of the pasta strands are over 15 cm length. In a most preferred embodiment more than 95% of the pasta strands in each nest are in the range of 25 cm to 30 cm in length.

Prior to freezing the quenched re-hydrated pasta may optionally be enrobed with oil (9) as a measure to reduce surface dehydration and damage during subsequent freezing steps, preferably this is achieved by spraying the pasta after quenching.

The pasta portions may also optionally undergo an encrusting step (post-oiling where appropriate) wherein the pasta within the dosing device (4) or cup component (5) thereof is exposed to a cryogenic coolant or high-speed cold air. This provides surface freezing of the pasta which can preserve a precise nest shape when removed from the dosing device or cup component thereof, and tipped onto a freezing belt for the final freezing step.

It is particularly appreciated that the steps of the process described herein for the preparation of frozen instant cooking pasta can be advantageously repeated as a continuous automated cycle of production.

A particular embodiment of the invention relates to instant cooking frozen pasta obtainable by the process as outlined in the above description.

A further particular aspect of the invention resides in apparatus for the manufacture of frozen pasta according to the above description therein comprising:
(i) a weighing means (3);
(ii) a plurality of dosing devices (4) attached to an endless chain;
(iii) a blanching means (11) into which said dosing devices (4) are submergible;
(iv) a freezing means (12)

The weighing means is upstream of the plurality of dosing devices.

Moreover the invention comprises apparatus as described above wherein said dosing device (4) comprises; a perforated tube component and perforated cup component which are positioned to form a retaining means within the blanching means (11) by virtue of their attachment to separate rotating endless chains (10) which operate in a co-ordinated cycle that allows positioning of the components so that pasta can be loaded into the tube (4) from above and move through the blanching means (11).

In a preferred embodiment the dosing devices adopt a substantially vertical position within the boiling water of the blanching means in such way assisting in the formation of pasta nests within the cup component.

Preferably the attachment of the dosing devices to the endless chains is reversible to facilitate their cleaning.

The dosing device (4) of the apparatus according to the invention may be constructed from any material that is resistant to temperature up to 100° C., thermic shock and exposure to high salt content. Obviously this material must also be suitable for use in the preparation of food. Preferably the dosing device (4) is constructed from stainless steel with the cup component (5) be formed from a stainless steel mesh material.

Frozen pasta of the present invention may be put to a number of uses, frozen oiled pasta may be reheated in a pan without any addition ingredients or may be reheated in a pan of boiling water. The pasta can be added to any kind of dish at the desire of the consumer.

Alternatively the frozen pasta of the invention may be packaged with sauce pellets and may be reheated together by a number of suitable methods. Where the re-hydrated mass of pasta is less than around 30 g it is possible to reheat in a pan from frozen with sauce pellets in less than about 5 minutes.

A microwave oven or conventional gas fired/electric oven could also be used to firstly melt sauce pellets to which the frozen pasta can be added and reheated. The frozen pasta may also be packaged in a frozen sauce for re-heating in microwave or conventional oven.

A further embodiment of the invention is therefore directed to a packaged frozen product comprising one or more instant cooking nests of a re-hydrated elongated dried pasta product according to the description above.

The invention claimed is:

1. Apparatus for manufacture of frozen elongated pasta bundles comprising:
   (i) a weigher upstream of a plurality of dosing devices;
   (ii) the plurality of dosing devices being attached to rotating endless chains, the plurality of dosing devices each comprising a perforated tube and perforated cup;
   (iii) a blancher into which said plurality of dosing devices are submergible and for re-hydration of the dried elongated pasta after the pasta has been loaded into the plurality of dosing devices, the perforated tube and perforated cup being positioned to form a retaining means within the blancher by virtue of their attachment to the separate rotating endless chains; and
   (iv) a freezer, said apparatus providing for avoidance of cutting as means of dividing the re-hydrated elongated pasta.

2. Apparatus according to claim 1 wherein said plurality of dosing devices adopt a substantially vertical position within the blancher.

3. Apparatus according to claim 1 wherein the perforated cup has a flexible base that facilitates emptying thereof.

4. The apparatus according to claim 1 wherein the plurality of dosing devices have a concave, cone-shape indentation.

* * * * *